United States Patent
Wachs et al.

[11] Patent Number: 5,771,019
[45] Date of Patent: Jun. 23, 1998

[54] METHOD AND SYSTEM FOR DETERMINING THE LOCATION OF A SENSE ANTENNA ASSOCIATED WITH A PHASED ARRAY COMMUNICATION SYSTEM

[75] Inventors: Marvin R. Wachs, Calabasas; Arnold L. Berman, Los Angeles, both of Calif.

[73] Assignee: Hughes Electronics Corporation, Los Angeles, Calif.

[21] Appl. No.: 709,957

[22] Filed: Sep. 9, 1996

[51] Int. Cl.⁶ .................................................. G01S 5/04
[52] U.S. Cl. ........................ 342/442; 342/127; 342/174
[58] Field of Search .................................. 342/127, 174, 342/360, 442

[56] References Cited

U.S. PATENT DOCUMENTS

| | | | |
|---|---|---|---|
| 3,697,997 | 10/1972 | Cooper | 343/108 R |
| 4,639,733 | 1/1987 | King et al. | 342/424 |
| 4,788,548 | 11/1988 | Hammerquist | 342/458 |
| 5,266,958 | 11/1993 | Durboraw, III | 342/357 |
| 5,530,449 | 6/1996 | Wachs et al. | 342/174 |
| 5,541,608 | 7/1996 | Murphy et al. | 342/442 |
| 5,552,791 | 9/1996 | Metal | 342/174 |

*Primary Examiner*—Thomas H. Tarcza
*Assistant Examiner*—Dao L. Phan
*Attorney, Agent, or Firm*—Terje Gudmestad; Michael W. Sales

[57] ABSTRACT

A method and system for determining an actual location of a sense antenna associated with a phased array communications satellite. A plurality of calibration carrier signals are transmitted at known frequencies. Each of the plurality of calibration carrier signals are received at a second frequency and compared with each of the plurality of transmitted calibration carrier signals. The actual location of the sense antenna is determined based on the comparison between the known frequency and the second frequency. The phased array communications satellite then broadcasts communication signals based on the actual location of the sense antenna rather than a desired location of the sense antenna.

19 Claims, 3 Drawing Sheets

METHOD AND SYSTEM FOR DETERMINING THE LOCATION OF A SENSE ANTENNA ASSOCIATED WITH A PHASED ARRAY COMMUNICATION SYSTEM

TECHNICAL FIELD

This invention relates to phased array communication systems, and more particularly, to a method and system for determining the location of a sense antenna associated with the phased array communication system.

BACKGROUND ART

Large satellites employing phased arrays normally require deployment of antenna components after arriving on orbit. For example, a phased array communication system disclosed in U.S. Ser. No. 08/342,541, filed Nov. 18, 1994 and entitled "Phased Array Antenna Management System and Calibration Method," utilizes a local sense antenna in calibrating the phased array communication system. The sense antenna receives carrier signals transmitted from each chain of the phased array antennas and transmits a corresponding output signal to a processor for processing and/or application of corrective weighting coefficients to the respective antenna element chains. Thus, failures and/or variations in performance of the components of the phased array antennas can be monitored and compensated accordingly.

While mechanical antenna deployment systems are designed for maximum reliability, there exists a possibility that the antenna will not be perfectly located by the deployment mechanism. By being able to determine the deployed location of the antenna, any errors in the placement of the antenna can be mathematically compensated for in the measurements made by the antenna.

Conventional approaches to determining the location of an antenna associated with a phased array communication system depend on the use of prohibitively expensive auxiliary sensors, such as mechanical or optical sensors.

DISCLOSURE OF THE INVENTION

It is thus a general object of the present invention to provide an inexpensive method and system for determining the location of a sense antenna associated with a phased array communication system.

In carrying out the above object and other objects, features and advantages, of the present invention, a method is provided for determining the actual location of a sense antenna associated with a phased array communication system. The method includes the step of transmitting a plurality of calibration carrier signals at a predetermined frequency. The method also includes the step of receiving each of the plurality of calibration carrier signals at a second frequency. The method further includes the step of comparing the second frequency of each of the received signals with the predetermined frequency of each of the plurality of calibration carrier signals. Finally, the method includes the step of determining the actual location of the sense antenna based on the comparison between the predetermined frequency and the second frequency.

In further carrying out the above object and other objects, features and advantages, of the present invention, a system is also provided for carrying out the steps of the above described method. The system includes a calibration carrier source for generating a plurality of calibration carrier signals each at a predetermined frequency. The system also includes the sense antenna for transmitting the plurality of calibration carrier signals for receipt by the phased array satellite or for receiving the plurality of calibration carrier signals. Still further, the system includes a processor for comparing the frequency of each of the plurality of received signals with the predetermined frequency of each of the transmitted plurality of calibration carrier signals and for determining the actual location of the sense antenna based on the comparison.

Still further in carrying out the above object and other objects, features and advantages of the present invention, a communications satellite is provided. The communications satellite includes a calibration carrier source for generating a plurality of calibration carrier signals. The communications satellite further includes a transmit phased array antenna, in communication with the calibration carrier source, having a first plurality of transmit array elements for transmitting a beam-formed signal wherein a second plurality of the first plurality of transmit array elements selectively transmit the plurality of calibration carrier signals. The communications satellite also includes a transmit sense antenna, in communication with the calibration carrier source, for receiving each of the plurality of calibration signals transmitted by the second plurality of transmit array elements. The communications satellite further includes a receive phased array antenna, in communication with the calibration carrier source, having a first plurality of receive array elements for receiving a beam-formed signal wherein a second plurality of the first plurality of receive array elements selectively receive the plurality of calibration carrier signals. The communications satellite still further includes a receive sense antenna, in communication with the calibration carrier source, for transmitting the plurality of calibration carrier signals to the second plurality of receive array elements. Finally, the communications satellite includes a processor connected to the transmit sense antenna, the receive sense antenna, the second plurality of transmit array elements, and the second plurality of receive array elements for comparing each of the plurality of received signals with each of the plurality of calibration carrier signals and for determining the actual location of the transmit sense antenna and the receive sense antenna based on the comparison.

The above object and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
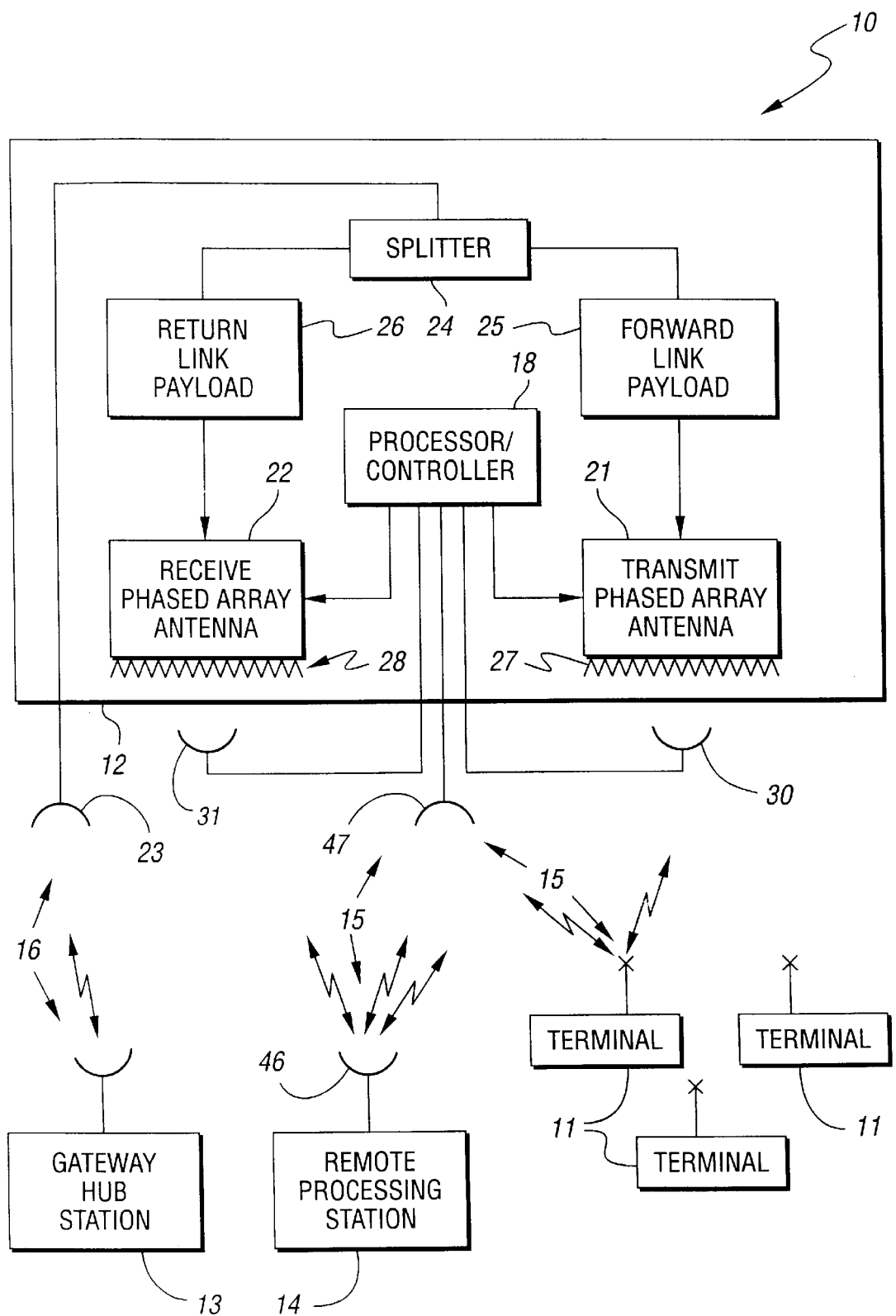
FIG. 1 illustrates a phased array-based communications satellite system employing the principles of the present invention.

Referring now to FIG. 1, there is shown a typical phased array-based communications satellite system 10 employing the principles of the present invention. The communications satellite system 10 includes a satellite 12, a gateway hub station 13 and a plurality of user mobile terminals 11. The satellite system 10 may include a remote processing station 14. A mobile communications link 15 from the satellite 12 to the user mobile terminals 11 is provided at S band, for example, while a gateway communications link 16 from the satellite 12 to the gateway hub station 13 is at Ka band, for example. The S band mobile communications link 15 may also be used to provide communications between the remote processing station 14 and the satellite 12. A feeder antenna 23 that may use a gimbaled reflector and operate at Ka band, for example, is provided to service the gateway communications link 16 between the satellite 12 and the gateway hub station 13. A second antenna 47 is provided to service the mobile communications link 15 between the satellite 12 and the user mobile terminals 11 and the remote processing station 14.

As shown in FIG. 1, the satellite 12 includes a transmit (forward) phased array antenna 21 and a receive (return) phased array antenna 22 that service the mobile communications link 15 between the calibration station 14, the satellite 12 and the plurality of user mobile terminals 11. The transmit and receive phased array antennas 21, 22 each include a plurality of array elements 27, 28, respectively. A transmit link payload 25 and a receive link payload 26 are respectively coupled between the transmit and receive phased array antennas 21, 22 and the feeder antenna 23 by way of a power splitter 24. The transmit and receive link payloads 25, 26 include control and processing electronics and maneuvering systems required for operation of the satellite 12.

With regard to both the transmit and receive paths (feeder antenna 23, power splitter 24, transmit link payload 25 and transmit phased array antenna 21; feeder antenna 23, power splitter 24, receive link payload 26 and receive phased array antenna 22), a phased array beam forming function is performed on the satellite 12 by a digital processor 18, or controller 18, that forms part of the respective transmit and receive link payloads 25, 26. The amplitude and phase control function performed by the processor 18 is routine in the art and will not be described in detail herein.

The satellite 12 also includes a transmit sense antenna 30 disposed opposite the transmit phased array antenna 21 for sampling the outputs of the transmit array elements 27 and providing a feedback to the processor 18. A receive sense antenna 31 is disposed opposite the receive phased array antenna 22 for transmitting a signal to the receive array elements 28 which provide a feedback to the processor 18. The transmit and receive sense antennas 30 and 31, respectively, are typically deployed upon the satellite 12 reaching orbit.

The specific embodiments of the present invention that are detailed below depend upon where the actual location of the sense antennas 30,31 are computed. For example, in one embodiment, signals are transmitted from the satellite 12 to the remote processing station 14, which provides the computational capability to determine the active location of the sense antennas 30,31. The remote processing station 14 receives signals from the satellite 12 via an antenna 46. If a self-contained system is employed, a local signal source is used to provide a calibration signal for use by the processor 18 which computes the actual location of the sense antennas 30,31 The self-contained system constitutes a closed loop system with no human intervention, in that the error measurements directly control the corrections. Such a closed loop system may also be implemented with a remote earth station as well as the sense antennas 30,31.

Figure 2:
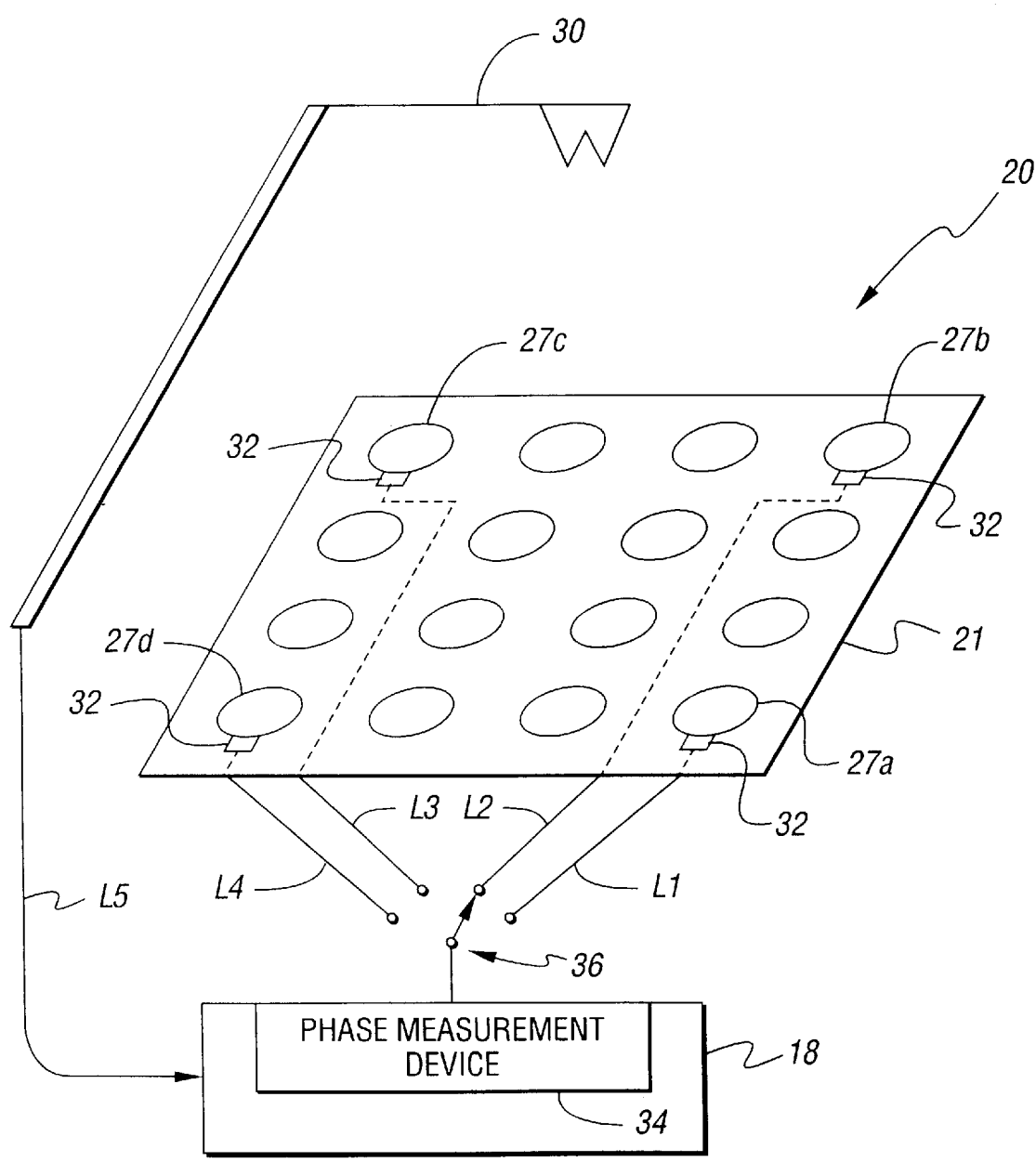
FIG. 2 illustrates the system of the present invention utilized in conjunction with the phased array-based communications satellite system shown in FIG. 1.

FIG. 2 illustrates the operation of the closed-loop system of the present invention. The present invention also applies to the situation in which the remote processing station 14 computes the correct location of the sense antennas 30,31. As can be seen in FIG. 2, the transmit sense antenna 30 is disposed in the field of view of the plurality of transmit array elements 27 of the transmit phased array antenna 21. Three or more array elements 27, appropriately chosen across the face of the transmit phased array antenna 21, are selected as reference points. Each of the reference array elements 27a, 27b, 27c and 27d is equipped with a directional coupler 32, which samples the calibration carrier immediately preceding the respective reference array element 27a, 27b, 27c and 27d. Each directional coupler 32 is respectively connected by a known electrical length cable L1, L2, L3 and L4 to the input of a phase measurement device 34 via a selection switch 36. The phase measurement device 34 is functionally equivalent to a vector voltmeter and has the capability to measure the phase difference between the transmitted and received calibration carrier signal phases. The phase measurement device 34 may be incorporated into the processor 18.

A calibration carrier signal is locally generated by the phase measurement device 34 and radiated from each of the reference array elements 27a, 27b, 27c and 27d, one at a time. The calibration carrier signal is generated at a frequency corresponding to the communication frequency. The carrier signal is sufficiently small (narrow bandwidth, low power, or encoded, etc.) so that it does not create unacceptable interference with normal communications traffic communicated by the satellite system 10.

The precise location of the transmit sense antenna 30 relative to the geometrical coordinate system of the phased array antenna 21 can be established by determining the differences in distances from each of the three or more reference array elements 27a, 27b, 27c and 27d to the transmit sense antenna 30. The computation of this location is well known and similar to that employed by hyperbolic navigation systems such as LORAN.

The phase measurement device 34 automatically applies the carrier signal to each of the reference array elements 27a, 27b, 27c, 27d which then radiate the carrier signal to the transmit sense antenna 30. For each carrier signal received, the transmit sense antenna 30 provides a feedback to the phase measurement device 34 which compares each of the carrier signals received by the transmit sense antenna 30 with the carrier signal sampled by the directional coupler 32 of the reference array elements 27a, 27b, 27c, 27d. The phase measurement device 34 then determines a relative phase, or phase difference, between the carrier signal samples. This procedure is repeated at several frequencies to permit the unambiguous determination of path length.

The path consists of three sections. Section 1 of the path is the length of the cable L from the directional coupler 32 to the phase measurement device 34. The electrical length of the cable L is known by virtue of design, physical measurement and predictable behavior over environmental and life variations. Section 2 of the path is the free space radiation from the array elements 27 to the transmit sense antenna 30. Section 3 of the path is the transmission line L5 from the transmit sense antenna 30 to the phase measurement device 34.

Since the distance corresponding to Section 1 of the path is known with sufficient accuracy, this distance may be subtracted from the computations. For example, if the phase difference between the carrier signal sampled by reference array element 27a and the carrier signal received by the transmit sense antenna 30 is 30°, the phase difference is first converted into a linear distance and then the Section 1 distance L1 is subtracted therefrom. The phase difference is converted into a linear distance based on the wavelength of a sinusoid signal, which is equal to 360°. A wavelength of a signal is equal to the speed of light divided by the frequency of the signal. Therefore, the distance can be determined as follows:

$$d=(\text{phase difference}/360°)*(\text{speed of light}/\text{frequency}).$$

The path length D is then equal to d−d(L1), where d(L1) is the length of the cable L1 from the directional coupler 32 of the reference array element 27a to the phase measurement device 34. Similar calculations are performed for each reference array element 27b, 27c, 27d.

The Section 3 distance is common to all the measurements, so it does not contribute to the determination of differences. The resulting Section 2 distances D, when taken in pairs, generates three dimensional hyperboloid surfaces. For three path differences, three hyperboloids are generated and their intersection defines the location of the transmit sense antenna 30. The intersection of the three path differences is determined using well known techniques such as hyperbolic or trilateration computations.

Similarly, the receive sense antenna 31 is disposed in the field of view of the plurality of receive array elements 28 of the receive phased array antenna 22. The receive sense antenna 31 transmits the plurality of calibration carrier signals which are received by a plurality of the receive array elements 28. The plurality of receive array elements 28 provide a feedback to the phase measurement device 34 which then computes the actual location of the receive sense antenna 31 accordingly.

Figure 3:
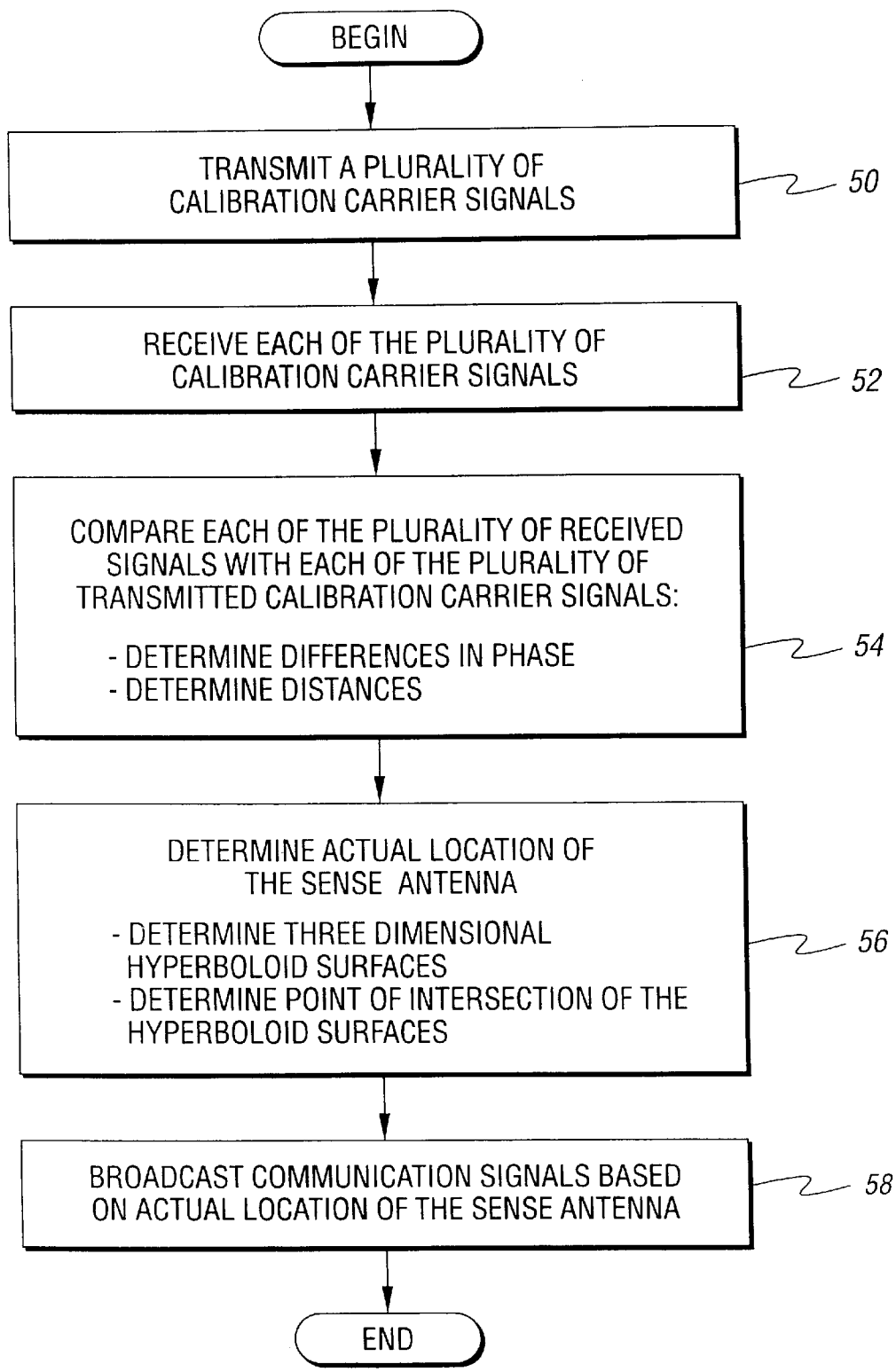
FIG. 3 is a flow diagram illustrating the general sequence of steps associated with the operation of the present invention.

Turning now to FIG. 3, there is shown a flow diagram illustrating the general sequence of steps associated with the method of the present invention. The calibration carrier signal is transmitted as shown at block 50. It may be transmitted by the receive sense antenna 31 for receipt by the receive array elements 28 or radiated from the transmit array elements 27a, 27b, 27c, 27d for receipt by the transmit sense antenna 30. The receive array elements 28 and the transmit sense antenna 30 receive these signals which are fed back to the phase measurement device 34, as shown at block 52.

Each of the received signals is compared with each of the corresponding transmitted calibration carrier signals, as shown at block 54. A phase difference between each of the calibration carrier signals transmitted and each of the signals received is determined. The phase difference is then converted into a linear distance.

Next, the actual location of the transmit sense antenna 30 and the receive sense antenna 31 can then be determined based on the comparison, as shown at block 56. For each pair of linear distances determined, a three dimensional hyperboloid surface is determined. A point corresponding to the intersection of the hyperboloid surface is determined corresponding to the actual location of the sense antennas 30,31.

Finally, the communication signals from the phased array satellite are broadcasted based on the determined actual location of the sense antennas 30,31, as shown at block 58. A correction factor is determined based on the difference between the actual location of the sense antennas 30,31 and a desired location of the sense antennas 30,31. The correction factor is applied to the communication signals before they are broadcasted.

The method and system of the present invention may be employed on a continuous basis or infrequently, depending upon the satellite system 10 in which it is used. Computation of the actual location of the sense antenna may be performed at a remote location, such as the remote processing station 14, where human operators determine the location, or on the satellite 12 using a closed-loop feedback path between the array elements 27,28 and the sense antennas 30,31, respectively.

While the best modes for carrying out the invention have been described in detail, those familiar with the art to which this invention relates will recognize various alternative designs and embodiments for practicing the invention as defined by the following claims.

What is claimed is:

1. A method for determining an actual location of a sense antenna associated with a phased array antenna of a satellite for broadcasting communication signals, the method comprising the steps of:

transmitting a plurality of calibration carrier signals each at a predetermined frequency from one of the sense antenna and the phased array antenna;

receiving each of the plurality of calibration carrier signals at a second frequency at the other one of the sense antenna and the phased array antenna;

comparing the second frequency of each of the plurality of received signals with the predetermined frequency of each of the plurality of transmitted calibration carrier signals; and determining the actual location of the sense antenna relative to the phased array antenna based on the comparison between the predetermined frequency of each of the transmitted signals and the second frequency of each of the received signals utilizing triangulation techniques.

2. The method as recited in claim 1 wherein the step of comparing includes the step of determining a phase difference between each of the plurality of transmitted calibration carrier signals and each of the corresponding plurality of received signals.

3. The method as recited in claim 2 wherein the step of comparing further includes the step of determining a plurality of distances based on the determined phase differences.

4. The method as recited in claim 3 wherein the step of determining the actual location includes the step of determining a plurality of three dimensional hyperboloid surfaces based on the plurality of distances.

5. The method as recited in claim 4 wherein the step of determining the actual location further comprises the step of determining a point corresponding to the intersection of the plurality of three dimensional hyperboloid surfaces.

6. The method as recited in claim 1 further comprising the step of broadcasting the communication signals based on the determined actual location of the sense antenna.

7. The method as recited in claim 6 wherein the sense antenna has a desired location and wherein the step of broadcasting includes the step of determining a correction factor representing a difference between the actual location and the desired location of the sense antenna.

8. A system for determining an actual location of a sense antenna associated with a phased array antenna of a satellite for broadcasting communication signals and having a transmit phased array antenna and a receive phased array antenna, the system comprising:

a calibration carrier source in communication with the sense antenna and the phased array antenna for generating a plurality of calibration carrier signals each at a predetermined frequency for receipt by one of the sense antenna and the phased array antenna;

the sense antenna for transmitting the plurality of calibration carrier signals to the phased array antenna or for receiving the plurality of calibration carrier signals each at a second frequency from the phased array antenna;

the phased array antenna for transmitting the plurality of calibration carrier signals to the sense antenna for receiving the plurality of calibration carrier signals each at a third frequency from the sense antenna; and a processor, coupled to the sense antenna and the calibration carrier source, for comparing the second and third frequencies of each of the plurality of received signals with the predetermined frequency of each of the corresponding plurality of transmitted calibration carrier signals to determine the actual location of the sense antenna relative to the phased array antenna based on the comparison and triangulation techniques.

9. The system as recited in claim 8 wherein the calibration carrier source includes a selection switch for sequentially transmitting each of the plurality of calibration carrier signals.

10. The system as recited in claim 8 wherein the processor determines a phase difference between each of the plurality of transmitted calibration carrier signals and each of the plurality of corresponding received signals.

11. The system as recited in claim 10 wherein the processor determines a plurality of distances based on the determined phase differences.

12. The system as recited in claim 11 wherein the processor determines a plurality of three dimensional hyperboloid surfaces based on the plurality of distances.

13. The system as recited in claim 12 wherein the processor determines a point corresponding to an intersection of the plurality of three dimensional hyperboloid surfaces.

14. The system as recited in claim 8 further comprising the phased array antenna for broadcasting the communication signals based on the determined actual location of the sense antenna.

15. The system as recited in claim 14 wherein the sense antenna has a desired location and wherein the processor determines a correction factor representing a difference between the actual location and the desired location of the sense antenna.

16. A communication satellite comprising:

a calibration carrier source for generating a plurality of calibration carrier signals each at a predetermined frequency;

a transmit phased array antenna, in communication with the calibration carrier source, having a first plurality of transmit array elements for transmitting a beam-formed signal wherein a second plurality of the first plurality of transmit array elements selectively transmit the plurality of calibration carrier signals;

a transmit sense antenna, in communication with the calibration carrier source, for receiving each of the plurality of calibration carrier signals transmitted by the second plurality of transmit array elements at a second frequency;

a receive phased array antenna, in communication with the calibration carrier source, having a first plurality of receive array elements for receiving a beam-formed signal wherein a second plurality of the first plurality of receive elements selectively receive the plurality of calibration carrier signals at a third frequency;

a receive sense antenna, in communication with the calibration carrier source, for transmitting each of the plurality of calibration carrier signals to the second plurality of receive array elements; and a processor connected to the transmit sense antenna, the receive sense antenna, the second plurality of transmit array elements for comparing the second and third frequencies of each of the received signals with the predetermined frequency of each of the corresponding transmitted calibration carrier signals and for determining the actual location of the transmit sense antenna and the receive sense antenna relative to the phased array antenna based on the comparison and triangulation techniques.

17. The communications satellite as recited in claim 16 wherein the calibration carrier source includes a selection switch for sequentially transmitting the plurality of calibration carrier signals.

18. The communications satellite as recited in claim 16 wherein the communications satellite broadcasts communication signals based on the determined actual location of the transmit sense antenna and the receive sense antenna.

19. The communications satellite as recited in claim 18 wherein the transmit sense antenna and the receive sense antenna each has a desired location and wherein the communications satellite broadcasts communication signals based on a difference between the actual location and the desired location of each of the sense antennas.

* * * * *